US008630537B2

(12) United States Patent
Kadaba

(10) Patent No.: US 8,630,537 B2
(45) Date of Patent: Jan. 14, 2014

(54) APPARATUS FOR MONITORING A PACKAGE HANDLING SYSTEM

(75) Inventor: Nagesh Kadaba, Roswell, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 397 days.

(21) Appl. No.: 13/157,999

(22) Filed: Jun. 10, 2011

(65) Prior Publication Data

US 2011/0242299 A1 Oct. 6, 2011

Related U.S. Application Data

(62) Division of application No. 12/169,230, filed on Jul. 8, 2008, now Pat. No. 7,982,764.

(51) Int. Cl.
*B65G 43/00* (2006.01)
*G01M 99/00* (2011.01)

(52) U.S. Cl.
USPC .............................. 396/429; 73/865.9; 348/61

(58) Field of Classification Search
USPC ................ 73/865.8–865.9, 866.5; 198/502.1, 198/502.3; 348/61, 125, 135, 143, E7.086, 348/E7.088, E7.09; 396/429; 700/225, 229; 701/300
See application file for complete search history.

(56) References Cited

U.S. PATENT DOCUMENTS

| 3,438,489 | A | 4/1969 | Cambornac et al. |
| 4,234,926 | A | 11/1980 | Wallace et al. |
| 5,347,274 | A | 9/1994 | Hassett |
| 5,433,311 | A | 7/1995 | Bonnet |
| 5,489,017 | A | 2/1996 | Bonnet |
| 5,497,140 | A | 3/1996 | Tuttle |
| 5,547,063 | A | 8/1996 | Bonnet |
| 5,638,461 | A | 6/1997 | Fridge |
| 5,684,705 | A | 11/1997 | Herbert |
| 5,719,771 | A | 2/1998 | Buck et al. |
| 5,737,438 | A | 4/1998 | Zlotnick et al. |
| 5,774,876 | A | 6/1998 | Woolley et al. |

(Continued)

FOREIGN PATENT DOCUMENTS

| CA | 2345763 A1 | 4/2000 |
| EP | 0 996 105 A1 | 4/2000 |

(Continued)

OTHER PUBLICATIONS

"DHL and Partners Develop RFID Sensor Solution for Pharma Industry," Freight e-Business News & Resources, Dec. 21, 2006, http://www.eyefortransport.com/print.asp?news=54063.

(Continued)

*Primary Examiner* — Thomas P Noland
(74) *Attorney, Agent, or Firm* — Alston & Bird LLP

(57) ABSTRACT

A monitoring apparatus for sensing conditions associated with a package handling system. The monitoring apparatus includes a test package configured for being handled by the package handling system with non-test packages handled by the package handling system. The test package has a housing defining a test package interior and has at least one sensor positioned within the interior for sensing conditions associated with the package handling system. The sensor produces an output signal corresponding to the conditions that it senses. The test package further includes a support positioned within the test package interior and connecting the sensor to the housing so that the sensor is directed generally toward an outside of the test package for sensing conditions associated with the package handling system.

12 Claims, 2 Drawing Sheets

(56) References Cited

U.S. PATENT DOCUMENTS

| | | | |
|---|---|---|---|
| 5,892,441 | A | 4/1999 | Woolley et al. |
| 5,936,523 | A | 8/1999 | West |
| 5,971,587 | A | 10/1999 | Kato et al. |
| 6,005,211 | A | 12/1999 | Huang et al. |
| 6,112,166 | A | 8/2000 | Joosten |
| 6,249,227 | B1 | 6/2001 | Brady et al. |
| 6,285,916 | B1 | 9/2001 | Kadaba et al. |
| 6,294,997 | B1 | 9/2001 | Paratore et al. |
| 6,473,169 | B1 | 10/2002 | Dawley et al. |
| 6,483,434 | B1 | 11/2002 | UmiKer |
| 6,496,806 | B1 | 12/2002 | Horwitz et al. |
| 6,539,360 | B1 | 3/2003 | Kadaba |
| 6,557,758 | B1 | 5/2003 | Monico |
| 6,712,276 | B1 | 3/2004 | Abali et al. |
| 6,720,888 | B2 | 4/2004 | Eagleson et al. |
| 6,721,617 | B2 | 4/2004 | Kato et al. |
| 6,820,022 | B2 | 11/2004 | Popp et al. |
| 6,889,814 | B2 * | 5/2005 | Cerutti et al. ............... 198/358 |
| 6,892,512 | B2 | 5/2005 | Rice |
| 6,919,803 | B2 | 7/2005 | Breed |
| 6,944,574 | B2 | 9/2005 | LeBlanc et al. |
| 6,988,610 | B2 | 1/2006 | Fromme et al. |
| 7,009,517 | B2 | 3/2006 | Wood |
| 7,035,856 | B1 | 4/2006 | Morimoto |
| 7,047,153 | B2 | 5/2006 | Woods et al. |
| 7,130,709 | B2 | 10/2006 | Popp et al. |
| 7,130,710 | B2 | 10/2006 | Popp et al. |
| 7,143,087 | B2 * | 11/2006 | Fairweather ............... 707/770 |
| 7,149,658 | B2 | 12/2006 | Kadaba |
| 7,154,596 | B2 | 12/2006 | Quist |
| 7,162,319 | B2 | 1/2007 | Popp et al. |
| 7,454,315 | B2 | 11/2008 | Kadaba |
| 2002/0098272 | A1 | 7/2002 | Silver |
| 2002/0106273 | A1 * | 8/2002 | Huang et al. ............... 414/788.1 |
| 2003/0014143 | A1 | 1/2003 | Kato et al. |
| 2003/0101069 | A1 | 5/2003 | Sando |
| 2003/0146836 | A1 | 8/2003 | Wood |
| 2003/0163287 | A1 | 8/2003 | Vock et al. |
| 2004/0008123 | A1 | 1/2004 | Carrender et al. |
| 2004/0024644 | A1 | 2/2004 | Gui et al. |
| 2004/0049315 | A1 | 3/2004 | Sansone et al. |
| 2004/0100379 | A1 | 5/2004 | Boman et al. |
| 2004/0124977 | A1 | 7/2004 | Biffar |
| 2004/0143354 | A1 | 7/2004 | Kato et al. |
| 2004/0149826 | A1 | 8/2004 | Alleshouse |
| 2004/0193449 | A1 | 9/2004 | Wildman et al. |
| 2004/0243353 | A1 | 12/2004 | Aghassipour |
| 2004/0257203 | A1 | 12/2004 | Maltsev et al. |
| 2005/0073406 | A1 | 4/2005 | Easley et al. |
| 2005/0080566 | A1 | 4/2005 | Vock et al. |
| 2005/0099292 | A1 | 5/2005 | Sajkowsky |
| 2005/0116034 | A1 | 6/2005 | Satake et al. |
| 2006/0109106 | A1 | 5/2006 | Braun |
| 2010/0245105 | A1 | 9/2010 | Smith |

FOREIGN PATENT DOCUMENTS

| | | |
|---|---|---|
| WO | WO 00/19392 A1 | 4/2000 |
| WO | WO 02/26566 | 4/2002 |
| WO | WO 2005/022303 A3 | 3/2005 |

OTHER PUBLICATIONS

"Deutsche Post World Net Starts "DHL Innovation Initiative" with IBM, Intel, Philips, and SAP," *DHL Press Release,* Feb. 16, 2008, DHL International GmbH.

"DHL and Partners Develop RFID Sensor Solution for the Pharmaceutical Industry," DHL Press Release, Dec. 20, 2006, DHL International GmbH.

Alien Technology, "2450 MHz Long Range Backscatter RFID System," webstie article, 6 pages, Jan. 29, 2004; http://liveweb.archive.org/http://www.alientechnology.com/index.php?option=displaypage&Itemid=61&op=page&SubMenu=.

Auto ID Center, "Auto-ID on the Move: The Value of Auto-ID Technology in Freight Transportation," Accenture White Pages, pages Cover, 1-26, Nov. 1, 2002, Distribution Restricted to Sponsors Until Feb. 1, 2003, Cambridge, Massachusetts.

FedEx Custom Critical, "FedEx Custom Critical Launches TEMP-ASSURE Validated$^{SM}$", Press Release, 1 page, Feb. 4, 2004, Akron, Ohio.

Syscan International Inc., "New RFID Based Solution for Perishable Products," Accelerating Business Efficiency, 1 page, May 20, 2003, Montreal, Quebec.

Sharp, "In Supply Chain Applications Such As Food Safety Monitoring, ADC Devices Go Beyond Mere Identification to Report on the World Around Them," A Sense of the Real World, 5 pages, Sep. 2000.

Shreiner, "E-temp-label," Website Article from www.schreiner-online.com/en/html/gb/medipharm/e-temp-label.htm#, Nov. 29, 2003, 3 pages.

Sensitech, "Cold Chain Market Shipment Logistics System," Website Article from www.sensitech.com, pp. 13-15, 2001, Beverly, Massachusetts.

RFID Journal, "New Low-cost Temperature Sensor," Website Article from ww.rfidjournal.com/article/articleview/28/1/1/, Jul. 19, 2002.

Davie, A. *"Intelligent Taging for Transport and Logistics: The ParcelCall Approach,"* Jun. 2002, Electronics & Communication Engineering Journal, pp. 122-128.

Office Action dated Jul. 10, 2009 of related Canadian Applicaiton No. 2,554,871.

Office Action dated Mar. 2, 2010 of related Canadian Applicaiton No. 2,554,871.

Office Action dated Dec. 30, 2010 of related Canadian Applicaiton No. 2,554,871.

Office Action dated Sep. 20, 2007 of related European Applicaiton No. 04 789.481.1.

Office Action dated Feb. 11, 2010 of related European Applicaiton No. 04 789.481.1.

Office Action dated Mar. 20, 2009 of related Chinese Applicaiton No. 20040042301.5. (English Translation).

Office Action dated Feb. 5, 2010 of related Chinese Applicaiton No. 20040042301.5. (English Translation).

Office Action dated Aug. 13, 2010 of related Chinese Applicaiton No. 20040042301.5. (English Translation).

International Search Report mailed Jan. 19, 2005 of related international application No. PCT/US2004/032470.

International Preliminary Report on Patentability mailed Jan. 10, 2006 of related international application No. PCT/US2004/032470, and Written Opinion mailed Jan. 19, 2005, of related international application No. PCT/US2004/032470.

* cited by examiner

APPARATUS FOR MONITORING A PACKAGE HANDLING SYSTEM

CROSS-REFERENCE TO RELATED APPLICATIONS

This application is a divisional of U.S. patent application Ser. No. 12/169,230, filed Jul. 8, 2008 now U.S. Pat. No. 7,982,764, which is incorporated herein by reference, together with any and all attachments and exhibits thereto. The full benefit and priority of all applications are claimed.

FIELD OF THE INVENTION

Various embodiments of the present invention relate to a monitoring apparatus and, more specifically, to apparatus for monitoring conditions associated with a package handling system.

BACKGROUND OF THE DISCLOSURE

Package handling systems, such as conveyor belt systems moving packages or parcels about a warehouse or delivery hub, sometimes experience operational problems, such as a jam of the packages being handled by the system or a break in a conveyor belt of the system. Operators of these systems sometimes monitor conditions associated with the systems for determining when problems have occurred. Conventionally, if such monitoring is performed at all, it is often performed by personnel walking around the system looking for unwanted events or conditions.

Monitoring a package handling system using people walking around the system can be expensive, especially when it is determined that multiple personnel are needed to effectively monitor the entire system at one time. Monitoring a package handling system using people constantly inspecting the system can also be expensive considering the time periods at which monitoring is desired. For example, considering that some package handling systems may run continuously, monitoring personnel could be needed for most of the hours of a day and even perhaps for 24-hour monitoring. Moreover, personnel often cannot see certain aspects of the package handling system during operation of the system, such as within tunnels or other equipment of the package handling systems through which packages move while being handled.

BRIEF SUMMARY OF THE DISCLOSURE

Various embodiments of the present invention relate to an apparatus for monitoring conditions associated with a package handling system. The monitoring apparatus includes a test package configured for being handled by the package handling system with non-test packages handled by the package handling system. The test package has a housing defining a test package interior. The test package also has at least one sensor positioned within the interior of the housing for sensing conditions associated with the package handling system. The sensor produces an output signal corresponding to the conditions that it senses. The test package further includes a support positioned within the test package interior and connecting the sensor to the housing so that the sensor is directed generally toward an outside of the test package for sensing conditions associated with the package handling system.

Various embodiments of the present invention relate to a method of monitoring a package handling system using a test package, wherein the test package has an interior and a sensor positioned therein. The method includes sensing conditions associated with the package handling system using the sensor of the test package while the test package is being handled by the handling system.

BRIEF DESCRIPTION OF THE DRAWINGS

Having described various embodiments of the invention in general terms, reference will now be made to the accompanying drawings, which are not necessarily drawn to scale, and wherein.

DETAILED DESCRIPTION OF THE DISCLOSURE

The present invention will now be described more fully hereinafter with reference to the accompanying figures, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

Various embodiments of the present invention are directed to an apparatus for monitoring a package handling system. The monitoring apparatus of these embodiments includes a test package having at least one sensor for sensing conditions associated with the package handling system, such as a leak or a tear in a part of the handling system. In particular embodiments of the present invention, the sensor includes a video camera for capturing images of the package handling system. In particular embodiments, the test package includes a wireless transmitter and the package handling test system also includes remote devices having a receiver and a processor for receiving and processing wireless signals received from the test package sensor to determine whether an unwanted condition of the package handling system (e.g., a leak or a tear) is present. The remote devices may also include communication elements, such as a visual display or siren, connected to the processor. The communications devices may be used for, among other purposes, notifying users of the package handling system when an unwanted condition exists.

Figure 1:
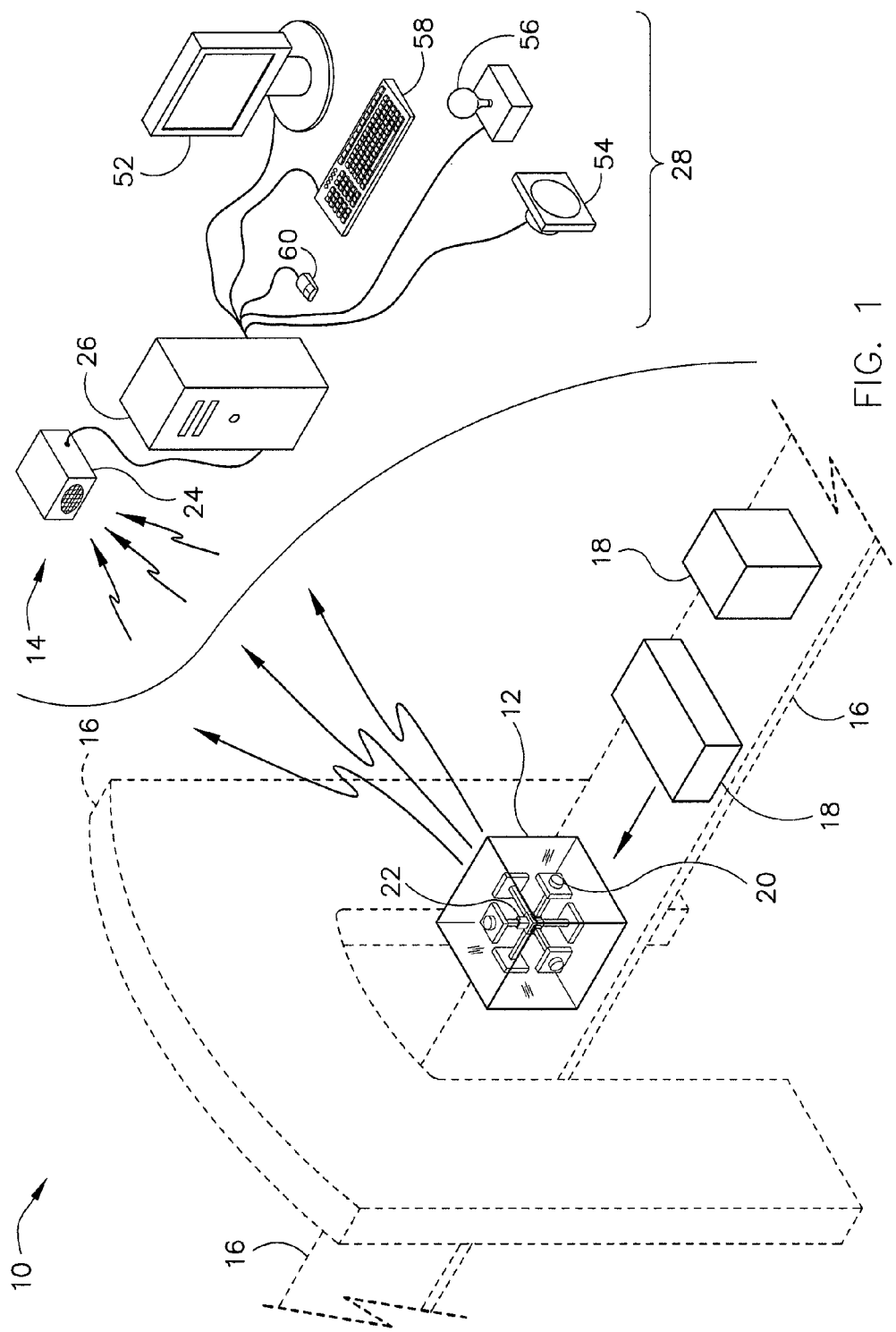
FIG. 1 is a perspective of a monitoring system according to a particular embodiment of the present invention shown in combination with a package handling system.

Referring to the figures, and more particularly to FIG. 1, a monitoring apparatus according to a first embodiment of the present invention is designated in its entirety by reference number 10. The monitoring apparatus 10, or test package system, includes a test parcel or package 12 and may include remote devices 14 with which the test package can wirelessly communicate. The monitoring apparatus 10 is used for monitoring conditions associated with a package handling system 16, such as a conventional conveyor belt system used for transporting packages within a warehouse. During operation of the monitoring apparatus 10, the test package 12 is positioned within the package handling system 16 for monitoring the system while it is being handled by the system.

The package handling system 16 may include machinery, devices, vehicles, and people and is not limited to a conveyor system. For example, in some embodiments, the package handling system 16 may include a subsystem in which the test package 12 is picked from an inventory shelf, a conveying subsystem (e.g., as shown in part in FIG. 1), and post-conveying subsystems, such as people and machines moving the test package to a delivery truck, which may also be part of the package handling system. The monitoring apparatus 10 may be used in combination with non-monitoring or non-test packages 18 being handled within the package handling system 16 with the test package 12. The test package 12 may resemble the non-test packages 18 in many ways, such as in size, shape, and material.

The test package 12 includes one or more sensors 20 for sensing conditions associated with the package handling system 16. The sensors 20 may include various types of sensing devices, such as video cameras and infrared sensors. For embodiments of the present invention in which the sensors 20 include cameras, the cameras may be high-definition and low-light-capable cameras. Whatever their type, the sensors 20 may include self-leveling and shock-absorbing features available in many modern sensors. Other exemplary types of sensors 20 that may be used as part of the test package 12 include ultrasonic sensors, chemical sensors, photo detectors, radar detectors, thermal sensors, capacitance sensors, speed sensors, accelerometers, and sensors for detecting a magnetic field. Each sensor 20 produces a sensor output signal corresponding to the conditions that it senses.

The test package 12 may also include a transmitter 22 operatively connected to the sensors 20. The transmitter 22 is arranged to receive the sensor output signals and wirelessly transmit the signals to the remote devices 14. The transmitter 22 may be a transponder, being able to transmit communication signals (e.g., sensor output signals) and also receive communication signals. It is contemplated that in some embodiments the transmitter 22 may be configured for receiving signals from the sensors 20 and/or from outside of the test package 12 and transmitting the signals to a local processor positioned within the test package, but not for transmitting data signals out of the test package.

The transmitter 22 may be connected to the sensors 20 in a variety of ways such as by way of wires or by wireless connection using corresponding wireless devices (e.g., Wi-Fi or Bluetooth®) positioned within or connected to the transmitter 22 and the sensors 20 (Bluetooth is a registered trademark of Bluetooth Sig, Inc., Corporation, of Bellevue, Wash.). The remote devices 14 may be positioned remote from the test package 12 being handled by the package handling system 16. For example, the remote devices 14 may be positioned at a central location within a warehouse in which the package handling system operates or even more remotely, such as remote from such a warehouse. It is contemplated that the monitoring apparatus 10 may also be connected to a network, such as the Internet, for users of the apparatus to monitor or evaluate conditions associated with the package system at various times and from various locations.

The remote devices 14 of the monitoring apparatus 10 may include a receiver 24 and a processor 26 connected to the receiver. The receiver 24 is arranged for receiving wireless signals from the transmitter 22 of the test package 12 and transmitting the signals to the processor 26. The receiver 24 may be a transponder, being able to receive communication signals and also transmit communication signals, such as receiving communication signals from the transmitter 22 in the test package 12 and sending signals to the transmitter. It is contemplated that in some embodiments the receiver 24 may be configured for receiving signals from the remote processor 26 and transmitting them to the test package 12, but not for receiving signals from the test package.

As described below in further detail, the remote processor 26 may be configured to process the signals received from the sensors 20 by way of the transmitter 22 and the receiver 24. The processor 26 may be configured to process the sensor output signals by, for example, analyzing the signals to determine in real time whether an unwanted condition of the package handling system 16 exists at any particular time as the test package 12 is moving through the system. Exemplary unwanted conditions are a rip or tear in a conveyor belt of the package handling system 16, a leak in the handling system, a jam of packages being handling in the system, and characteristics indicating a likelihood of the presence or an imminent presence of such conditions. The unwanted conditions associated with the package handling system 16 can also relate to characteristics of the non-test packages 18, such as tears or leaks of the non-test packages. The test package 12 may also monitor desired or normal operations associated with the package handling system 16, such as normal movement of a conveyor belt of the package handling system 16, such as a speed of the conveyor belt when the speed is within a desired range.

The remote processor 26 may consider present or real-time data and historic data received from the test package 12 related to the package handling system 16. However, it is contemplated that the processor 26 may consider data received from sources other than the test package in monitoring the package handling system 16. For example, the processor 26 may receive and consider data from a system identifying a location of the test package, such as system including the electronic reader (e.g., RFID reader) reading the electronic indicia 46 (e.g., RFID tag). As another example, the processor 26 may consider data received from the package handling system 16, which may provide information to the processor, such as a speed of a conveyor belt in a particular section of the package handling system.

The remote devices 14 of the monitoring apparatus 10 may also include communication elements 28 operatively connected to the processor 26 for notifying users of the monitoring apparatus of conditions of the package handling system 16. Further, it is contemplated that in some embodiments of the present invention the communication elements 28 may be configured to allow users of the apparatus 10 to input desired information, such as for programming or instructing the processor 26 or the test package 12. It is also contemplated that, in some embodiments of the present invention, the communication elements 28 may be configured to allow users of the apparatus 10 to selectively review information, such as for examining present or real-time data and historical data produced by the processor 26 using the output signals of the sensors 20.

Figure 2:
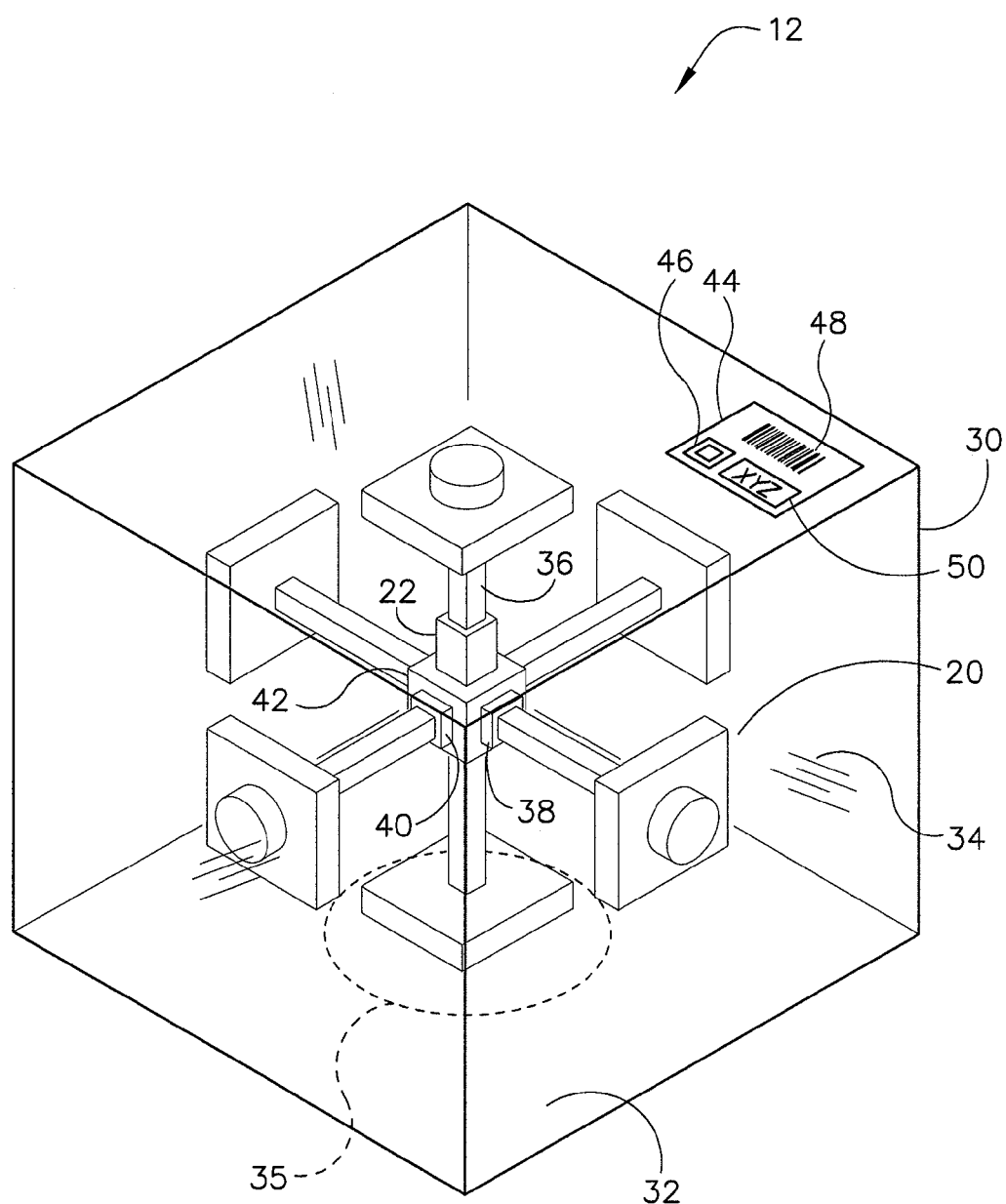
FIG. 2 is a perspective of a test package of the monitoring system shown in FIG. 1.

As shown in FIG. 2, the test package 12 includes a frame or housing 30 defining an interior 32 of the test package. The sensors 20 and the transmitting device 22 may also be positioned in the interior 32 of the test package 12. The test package housing 30 may include one or more surfaces 34, such as sides or walls. The sensors 20 may be connected together by a sensor support 36, which may connect the sensors 20 to the housing 30. For example, the support 36 may directly contact the sensors 20 and directly contact the housing 30, although FIG. 2 does not show an embodiment in which the sensor support directly contacts the housing. In some embodiments of the present invention (not shown in detail), the sensor support 36 includes one or more components connecting the sensors 20 directly to the test package housing 30. For example, each sensor 20 may be connected to the housing 30 by various components of the sensor support 36.

FIG. 2 generally shows a embodiment of the present invention in which the sensors 20, the support 36 connecting the sensors, and the housing 30 are sized and shaped so that the sensors and support fit snugly within the housing so that a direct connection between the support and the housing is not needed to secure the sensors in place in the interior 32 of the test package 12. Instead, the sensors 20 directly contact the housing 30, which contributes to holding the sensors 20 in place in the test package 12. One or more parts of the housing 30, such as a wall, or panel of a wall, of the housing may be movable as described more below, to allow access to the interior of the housing, such as for installing and removing the sensors.

The sensor support 36 may include any of a variety of materials. In most embodiments of the present invention, the sensor support 36 is preferably light-weight and sturdy. Exemplary materials for the sensor support 36 include plastic and aluminum. For absorbing shock that the test package 20 may experience, such as during handling in the package handling system 16, it is contemplated that any one or a combination of the sensor support 36, the sensors 20, and the test package housing 30 may include impact, shock, or vibration-absorbing features (not shown in detail). For example, the sensor support 36 may include a spring or other damper to absorb forces or shock experienced by the test package 12, and thereby limit damage to the test package. The sensors 20 may include conventional shock-absorbing features. As shown in FIG. 2, the sensor support 36 may also connect the sensors to the transmitter 22 within the interior of the test package 12 and wires (not shown), which may connect the sensors and transmitter, may be disposed within the support. The test package 12 may also include a transmitter support (not shown) for connecting the transmitter 22 directly to the housing 30.

In some contemplated embodiments of the present invention, the sensor support 36 is configured to allow movement of the sensors 20 with respect to other parts of the test package 12. For example, the sensor support 36 may include a gyroscopic arrangement whereby orientation of one or more sensors 20 may be changed with respect to other parts of the test package 12. In a particular such contemplated embodiment, the sensor support 36 is arranged so that a sensor 20 is generally kept directed or biased in a specific direction, such as generally up or generally down. This bias can be accomplished using a support 36 allowing movement of the sensor 20 with respect to other parts of the package 12, such as a gyroscopic-type support, and selectively located weights biasing the support toward a position in which the sensor is oriented as desired.

The test package housing 30 may have various sizes and shapes and include a variety of materials without departing from the scope of the present invention. For example, the test package housing 30 may be configured so that the test package 12 in many ways resembles non-test packages 18 being handled by the package handling system 16. Particularly, for instance, the test package housing 30 may be sized and shaped like shells of some non-test packages 18 that the handling system 16 usually handles. This resemblance can facilitate the test package 12 being handled by the system 16 in a manner similar to the manner in which the non-test packages 18 are handled, thereby allowing the test package to generally move through the handling system with the other packages 18. The test package 12 can be configured to resemble non-test packages 18 in many ways, including by being sized and shaped similar to many non-test packages, having similar materials or similarly-behaving materials, and having similar weights.

Although the test package housing 30 may have other shapes without departing from the scope of the present invention, in one embodiment the test package housing forms a six-sided generally rectangular or square box. In other embodiments, the package has other shapes, such as by an eight-sided box. Although the test package housing 30 may have other lengths, widths, and heights without departing from the scope of the present invention, in one embodiment the housing has a length of between about 6 inches and about 110 inches, a width of between about 6 inches and about 90 inches, and a height of between about 6 inches and about 90 inches. In one particular embodiment, the housing 30 has a length, a width, and a height each being between about 10 inches and about 35 inches.

Although the housing 30 of the test package 12 may comprise other materials without departing from the scope of the present invention, in one embodiment the housing includes a paper-based product, such as cardboard, paperboard, or corrugated fiberboard. In selecting material for the housing 30, a designer may seek a material having a relatively high robustness so that the housing can generally maintain its physical characteristics (e.g., shape) through substantial handlings in the system 16. Another variable that a designer may consider in selecting material for the test package 12 housing 30 is an ability of the package to impersonate the other packages 18 being handled by the system. That is, in some embodiments of the present invention, the test package 12 is configured so that the test package moving through the package handling system 16 behaves similarly to non-test packages 18 moving through the handling system 18, such as being carried by the system and responding to stimuli from the system in similar ways.

The test package housing 30 may include a plastic, such as polyvinyl chloride (PVC) or polymethyl methacrylate (PMMA), or another relatively robust material that would hold up through substantial handlings in the system 16. PMMA is also known as Plexiglas®, a registered trademark owned by Arkema France, of Puteaux, France.

The surfaces 34 of the test package 12 may be configured to facilitate effective sensing of conditions outside of the test package by the sensors 20. For example, for embodiments of the monitoring apparatus 10 in which the sensors 20 include video cameras, the surfaces 34 can include visually transparent or translucent material positioned between the cameras and outside of the test package 12 allowing the cameras to see conditions outside of the test package. The test package housing 30 may include more than one material or spaces being free of material. For example, the test package 12 may include mostly a relatively hard paper product or other generally opaque material (e.g. PVC) forming the housing 30 at parts of the housing except at windows 35 positioned adjacent each sensor 20, between the sensor and outside of the test package. An exemplary window 35 is identified by dashed line in FIG. 2 adjacent one of the sensors 20, but may be present adjacent any number of the sensors 20.

The windows 35 of the test package 12 can be sized and shaped and comprise material or lack material allowing the sensors to better sense the conditions outside of the test package. For example, for embodiments of the present invention in which the sensors 20 are video cameras, the windows 35 can include a visually transparent or translucent material, such as Plexiglas®, allowing light to pass through the window and into the cameras. For other types of sensors 20 (e.g., infrared or vibrational sensors), the windows may include other materials conducive to facilitating effective operation of those sensors. In a contemplated embodiment of the invention (not shown), one or more of the windows 35 could be generally void of material, thereby being an opening adjacent the respective sensors through which the sensors can effectively sense conditions outside of the test package 12. The sensors 20 may partially or completely fill such windows 35, such as is the case when a lens, or a rim of the lens, of a camera extends into the window.

The windows 35 of the housing 30 of the test package 12 may have various shapes and sizes without departing form the scope of the present invention. For example, the window 35 may be sized and shaped to allow the sensors 20 to sense conditions within a desired broad or desired narrow range or scope. The shape of the windows 35 may be, for example, generally circular, oval, square, rectangle.

As mentioned above, the test package 12 may be configured to resemble non-test packages 18 in many ways including by having a weight similar to a weight common to many non-test packages. Although the test package 12 may have various weights without departing from the scope of the present invention, in one embodiment the test package weighs between about 10 pounds and about 150 pounds. For example, in one particular embodiment, the test package 12 weighs between about 20 pounds and about 50 pounds. In many embodiments of the present invention, the test package 12 is generally light, such as weighing less than about 40 pounds, thereby making it easier for users to carry the test package, such as carrying the test package within the package handling system 16 and to and from the handling system.

As shown in FIG. 2, the monitoring apparatus 10 may further include a locating device 38 for determining a location of the test package. The locating device 38 may be positioned within the test package 12. The location of the test package 12 can be transmitted to, or determined in, the remote processor 26 of the monitoring apparatus 10. The remote processor 26 can be configured to affiliate a location of the test package at a certain time, such as a present, real-time, location or a historic location, with conditions that the sensors 20 sense at the corresponding time (i.e., real time or past time). As an exemplary locating device 38, the monitoring apparatus 10 may include a global positioning system (GPS) receiver for receiving data from a GPS indicating or related to a position of the test package.

In one contemplated embodiment of the present invention (not shown), the monitoring system 10 includes multiple stationary signal stations (not shown) positioned adjacent and/or within the handling system 16 (e.g., in a warehouse in which the handling system is positioned) for sending and/or receiving locating signals (e.g., radiofrequency or RADAR signals) to/from a test package signal station in the test package 12. In this embodiment, the position of the test package 12 can be determined by, for example, evaluating distances between the signal station in the test package 12 and the various stationary signal stations using a common method such as triangulation. Such evaluation can take place in the test-package signal station or in a remote device, such as the remote processor 26, in a variety of ways. For example, location of the test package 12 can be determined at regular intervals (e.g., every 30 seconds) or upon occurrence of a particular happening such as the user requesting the processor 26 to seek the location or automatically upon determination that the sensors 20 of the test package 12 have sensed a particular events, such as a problem or potential problem.

In a contemplated embodiment of the present invention, the locating evaluation takes place in a local processor positioned within the test package 12 and connected to the locating device 38. Such local processor is described below in further detail. The monitoring apparatus 10 may be configured to determine the location of the test package 12 at any time. Knowing where the test package 12 is in real time as it senses a problem or potential problem before it occurs can be useful for many reasons, such as for accurately and quickly dispatching maintenance personnel.

As also shown in FIG. 2, the test package 12 may include a local power source 40, such as a conventional battery. The local power source 40 can be connected to any of the electronic parts of the testing package 12 (e.g., sensors 20, transmitter 22, locating device 38), such as by wires positioned within the sensor support 36, for providing operating power to those parts. The local power source 40 can include a conventional rechargeable battery. The local power source 40 can store power until it is needed by other parts of the test package 12. The local power source may be a so called "super capacitor", being rechargeable hundreds or thousands of times.

Exemplary local power sources 40 include nickel-metal hydride (NiMH) batteries, nickel-cadmium (NiCad) batteries, and lithium-ion (Li-ion) batteries. For embodiments of the present invention in which the test package 12 includes a rechargeable power source 40, the test package may include a power interface (not shown in detail) connected to the local power source by which the local power source can be connected to an external power source, such as a conventional wall socket, for recharging the local power source. It is contemplated that such power interface may include a connection point positioned completely within the interior 32 of the test package 12. For allowing access to the connection point of the power interface, the body 30 of the test package may be selectively movable, as described above. For example, one of the surfaces 34, or a portion of one of the surfaces (e.g., a panel), may include a hinge and a fastener for allowing a user to selectively access the connection point for charging the local power source 40 and thereafter securely close test package 12.

In other contemplated embodiments of the present invention (not shown in detail), the connection point of the power interface may extend to an exterior of the test package 12 so that a user may access the connection point for charging the local power source 40 without moving one of the surfaces 34 of the test package body 30 or a portion of one of the surfaces. In such embodiments, the test package 12 may include a cover that can be selectively positioned over the connection point of the power interface of the local power source 40 for protecting the connection point from external elements, such as moisture, parts of the package handling system 16, and non-test packages 18. The connection point cover may include, for example, a flap that is hinged and closable by, for example, a clasp or other fastener or a spring mechanism for biasing the cover to a closed position.

As mentioned above, the test package 12 may include a local processor 42. The local processor 42 may be connected to the sensors 20, the transmitter 22, the locating device 38, and the local power source 40. The local processor 42 may include any one of a variety of types of processors, such as a programmable logic controller (PLC). The local processor 42 may be configured to process data received from various parts of the test package 12, such as from the sensors 20 and the locating device 38. As mentioned above, the transmitter 22 and the receiver 24 may be transponders thereby allowing communication in both directions between the test package 12 and the remote devices 14. Accordingly, the local processor 42 may also be configured to receive data from the remote processor 26 or other device (e.g., from the package handling system 16) by way of the transmitter 22 and process that data.

In some contemplated embodiments of the present invention, the local processor 42 is configured to store data received from the sensors 20, instead of sending the data in real time to the remote devices 14, or along with such real-time transmission. In these embodiments, data relating to conditions of the package delivery system 16 sensed by the sensors 20 can be retrieved from the local processor 42 wirelessly or by wire connection (e.g., by wires positioned within the sensor support 36) at select times, such as after the test package 12 has completed an entire trip through the system.

The local processor 42 may also provide data to various parts of the test package 12, such as by sending instructions to the sensors 20, the transmitter 22, or the locating device 38, for controlling their operation. Specifically, for example, the local processor 42 may perform an initial processing of the sensor output signals and provide the result of the processing to the transmitter 22 for transmitting to the remote processor 26 for further processing. The local processor 42 may also communicate with the remote processor 26 by sending and receiving signals to/from the remote processor by way of the local transmitter 22 and the remote receiver 24. It is also contemplated that either or both processors 26, 42 may communicate with a processor (not shown) of the package handling system 16 for reasons including controlling the package handling system 16, controlling the monitoring apparatus 10, and monitoring the package handling, such as by evaluating data sensed by the test package 12.

The local processor 42 may send various types of data to the remote processor 26 and package handling system 16 in addition to data corresponding to output signals of the sensors 20, such as test package location data derived using data from the locating device 28. Through communications with the package handling system 16, the remote and local processors 26, 42 can determine helpful data, such as a speed at which the conveyor belt is moving in a particular section of a conveyor belt system, despite the test package 12 indicating that the test package is not moving in that section based on that sensed by the test package (e.g., there is a package jam in the system 16 keeping the test package from moving). Moreover, the remote and local processors 26, 42 and the package handling system 16 may be connected together and configured such that the monitoring apparatus 10 can control all or part of the package handling system. This type of control may be useful for a variety of reasons including for safety or maintenance reasons when the test package 12 senses a problem or a potential problem and changing the operation of the system 16 or a section thereof, such as by temporarily turning the system/section thereof off.

As shown in FIG. 2, the test package 12 may include an identifier 44 such as a label. The identifier 44 may be the same as, or in many ways resemble identifiers positioned on non-test packages 18 usually handled by the system 16. The identifier 44 may include any of multiple types of identifying indicia, such as electronic indicia 46, a bar code 48, and human-readable indicia 50, such as a printed address or identification number. As an exemplary electronic indicia 46, the test package 12 may include a radiofrequency identification tag (RFID tag), which can be configured to store data. For the present application, the RFID tag can be arranged to store data relating to an address or identification number for the package, such as the address or identification number shown in the human-readable indicia 50. Data stored on the RFID tag can be read by an RFID reader (not shown in detail), which may be a part of the monitoring apparatus 10, or a part of the package handling system 16. For example, RFID readers may be strategically positioned at locations within the package handling system 16 for determining when the test package 12 and non-test packages 18 pass particular points in the system. The RFID readers may also be used to identify along which route of multiple routes of the package handling system 16 the test package 12 and non-test packages should be guided by the system.

The identifier 44 can be changed or replaced with another identifier during use or between uses of the test package 12. For example, the electronic indicia 46 may be reprogrammed for associating different identifying information with the test package 12. As another example, the test package housing 30 and the identifier 44 may be configured so that the identifier can be easily removed, such as by pulling on an edge of the identifier thereby overcoming a force (e.g., adhesive, magnetic) holding the identifier to the housing, and replaced by another identifier. As yet another example, the identifier 44 may be covered with a subsequent identifier so that the subsequent identifier may be read to identify the test package 12. In this way, the information associated with the test package 12, such as information determining along which route of the package handling system 16 the test package will be guided, can be easily changed for monitoring various aspects (e.g., sections) of the package handling system.

In some embodiments, the electronic indicia 46 (e.g., RFID tag) must be powered in order to be read, while in others it does not need to be powered to be read. Electronic indicia 46 needing to be powered in order to be read may be powered in various ways. For example, in some particular embodiments, the electronic indicia 46 may be connected to the local power source 40, such as by wires. It is contemplated that the test package 12 including the local power source 40 and the electronic indicia 46 may be configured so that the electronic indicia can receive power wirelessly from the local power source. In other particular embodiments, the electronic indicia 46 can be powered by wireless signals, such as radiofrequency signals being transmitter to the electronic indicia. It is contemplated that the test package 12 including the electronic indicia 46 may be configured so that the electronic indicia receives power from the local power source 40 and from incoming wireless signals during operation of the test package 12.

As described above, the monitoring apparatus 10 may include remote devices 14 including the receiver 24, the processor 26, and communication elements 28 connected to the processor for communicating information to users of the apparatus and receiving information from the users. The transmitter 22 of the test package 12 and the receiver of the remote devices 14 of the monitoring apparatus 10 may be configured in a variety of ways, allowing various types of communications between the transmitter and the receiver. For example, the transmitter 22 and the receiver 24 can each be configured for communicating using Wi-Fi, radiofrequency (RF), infrared, Bluetooth®, wireless local area network (WLAN), or other types of signals (Bluetooth is a registered trademark of Bluetooth Sig, Inc., Corporation, of Bellevue, Wash.).

The remote processor 26 may include various types of computing devices. For example, the processor 26 may include a relatively simple programmable logic controller (PLC), a central processing unit (CPU), or a more complicated server or network of more than one of these devices. The processor 26 may be configured, such as by being programmed, to process data received from the test package 12 in a variety of ways without departing from the scope of the present invention. For example, in one embodiment, the processor 26 is configured to receive image data from sensor cameras of the test package 12 and to store the image data and/or communicate the image data to users of the monitoring apparatus 10 by way of the communications devices 28.

The remote processor 26 may also analyze data received from the test package 12 for automatically identifying particular events corresponding to the sensed conditions associated with the package handling system. For example, the processor 26 may be programmed to recognize when output signals of the sensors 20 indicate a problem in the package handling system 16. For instance, for embodiments of the present invention in which the sensors 20 are cameras, the processor 26 can be configured with an optical or image recognition algorithm or software package for analyzing images received from the sensors for evaluating conditions associated with the package handling system 16 and identifying particular events therein.

Optical recognition software can be programmed to analyze a variety of features within image data, such as is the case with conventional human face, retina, or fingerprint recognition software. The remote processor 26 may be configured to recognize events such as temperatures associated with the package handling system 16 (e.g., a temperature of a conveyor belt or a delivery vehicle cargo hold) being above or below a particular range or threshold, presence of moisture within or adjacent the system, presence of a jam of packages in the system, or a broken part of the system, such as a torn conveyor belt. The remote processor 26 may also be configured to determine whether such an event is possible, probable, or imminent based on the sensor 20 output data. For example, when the test package 12 senses that it and/or non-test packages 18 are being slowed below a certain speed, or below a certain speed for a certain amount of time, not amounting to a conclusion that there is already a jam, the processor may recognize that the sensed conditions indicate a potential, impending, or likely future package jam.

The monitoring apparatus 10 can include a calibrating or learning function in which the test package is stimulated (e.g., by actual handling in the system 16) and the processor 26 is programmed to recognize particular stimuli (e.g., a torn conveyor belt or a slow test package speed) as being associated with particular sensor output signals received by the processor during the learning (i.e., a learning phase). It is contemplated that the apparatus 10 may learn by sensing, processing, and being programmed before and during use of the apparatus. The processor 26 may also be configured to combine various pieces of real-time data and/or historic data received from the sensors to determine a present condition of the package handling system 16 or predict likely or sure future conditions.

In some contemplated embodiments of the present invention, the monitoring apparatus 10 includes more than one test package 12, which may be introduced into the package handling system 16 at the same time. In these embodiments, the remote processor 26 may be configured to process real-time data and/or historic data received from the multiple test packages 12 in evaluating operation of the package handling system 16.

The remote processor 26 may also be configured to determine characteristics associated with the test package 12 based on data received from the sensors 20. For example, the processor 26 may use optical recognition software to determine a speed, orientation, or location of the test package 12 based on images of the surrounding environs of the test package as it is being handled by the package handling system 16. For instance, the processor 26 can be programmed during the learning phase while the test package 12 is being moved through the package handling system 16 to recognize that various sensed stimuli (e.g., images received by camera sensors) correspond to various locations within the package handling system. Such test package 12 location data created by the processor using sensor 22 output signals may be further processed by the remote processor 26 instead of location data from the locating device 38 that may be in the test package 12, from package-location information from other sources, or in combination with any of these sources of location data.

It is contemplated that the local processor 42 and the remote processor 26 may be configured to include any or all of the features described herein regarding the other. For example, the local processor 42 may be programmed to analyze image data received from the sensors 20 for determining whether the sensors are sensing an unwanted condition associated with the package handling system 16.

As shown in FIG. 1, the communication elements 28 may include a visual display 52 for displaying information received from the processor 26. The processor 26 may be configured (e.g., programmed) to provide information to the visual display 52 for display to the user in any of a variety of formats, such as lists, spreadsheets, charts, and graphs. Information displayed by the visual display 52 can advise users of conditions associated with the package handling system 16 (e.g., "A package jam is imminent on conveyor number two". Such information may also include instructions advising the users how to proceed (e.g., "Please evacuate area four", "Please repair belt", and "Please alleviate jam").

The communication elements 28 of the monitoring apparatus 10 may also include an acoustic source 54, such as a speaker, buzzer, horn, or siren. By way of the acoustic source 54, the processor 26 can audibly communicate messages to users of the monitoring apparatus 10 and the package handling system 16. These messages can be verbal, advising users of conditions associated with the package handling system 16 (e.g., "A package jam is imminent on conveyor number two". Such verbal message may also include instructions advising the users how to proceed (e.g., "Please exit area four", "Please repair belt", and "Please alleviate jam").

The communication elements 28 may include other types of visual sources such as a light source 56. An exemplary light source is a light-emitting diode (LED). As with the visual display 52 and the acoustic source 54, the light source 56 may receive signals from the processor 26 and operate accordingly to communicate information to users of the monitoring apparatus 10 and the package handling system 16. For example, the light source 56 may include a green LED, a yellow LED, and a red LED, which may be selectively illuminated in response to corresponding signals from the processor 26 to respectively indicate to users, for example, good package handling system conditions, slightly or potentially problematic conditions, problematic conditions, or instructions for proceeding. The monitoring apparatus 10, and the processor 26 and light source 56 in particular, may also be configured to communicate various messages to users in other ways, such as by being illuminated/not illuminated or by blinking in various ways. Also, the light source 56 may include a light behind a message, such as "Please attend to jam on conveyor #2", which may be illuminated by a light of the light source 56 at instruction of the processor 26.

The apparatus 10 may include multiple elements of the various types of communication elements 28 (e.g., more than one visual display 52, more than one acoustic source 54, etc.). The communication elements 28 may be positioned at various locations, such as within the package handling system 16, in a remote central monitoring office near the handling system, and/or in an even further remote monitoring location, such as off site from the handling system. Communication elements 28 positioned in particular locations may display information particular to the location. For example, a visual display 52 positioned within or adjacent a specific part of the package handling system 16 may display information relevant only to users within or adjacent that part of the system (e.g., "Please attend to package jam in this area") and an acoustic source 54 positioned within or adjacent a specific part of the system may provide instructions and/or tones audible in that area for communicating to users in or adjacent that area.

As also shown in FIG. 1, the communication elements 28 may also include various input elements, such as a computer keyboard 58 and a mouse 60. As described above, the processor 26 and communication elements 28 (e.g., the keyboard 58 and the mouse 60) may be configured to allow users of the apparatus 10 to provide desired information into the monitoring apparatus 10. For example, users may input information to the processor 26 by way of the keyboard 58 for programming the processor or providing instructions or information to the test package 12 by way of the processor. For example, the user can communicate with the processor 26 to program the processor to provide the user with only certain information, such as to display only information from a first sensor 20 of multiple sensors of the test package 12. A user may also enable or temporarily disable parts of the monitoring apparatus 10, such as by selectively turning sensors 20 in the test package 12 on or off. For communications to and from the test package 12, the remote processor 26 may interact directly with parts of the test package (e.g., the sensors 20) or with the local processor 42, which in turn communicates with the other parts of the test package.

In operation, the test package 12 is placed in the package handling system 16, such as by being placed on a conveyor belt of a conveyor system. Because the test package may be configured to resemble a non-test package 18 (e.g., in size, shape, material, labeling) that the system usually handles, the package handling system 16 can handle the test package 12 during normal operation of the system. The test package 12 may be introduced into the system 16 at a beginning of the system or downstream of the beginning as desired.

As described above, in some embodiments of the present invention, more than one test package 12 may be placed in the package handling system 16 at the same time. These multiple test packages 16 may be introduced into the system in various ways, such as by being introduced to the system at the same place at about same time (e.g., sequentially), at different places at about the same time, at the same place at different times, or at different places at different times. As mentioned above, the test package 12 may be handled by the package handling system 16 and monitor the system at the same time that the system is handling non-test packages 18.

While the test package 12 is being handled by the package handling system 16, the one or more sensors 20 of the test package may sense conditions associated with the package handling system. For example, when one of the sensors 20 is a camera, the camera receives video or images of the package handling system 16 and/or the environment surrounding the system. As another example, when one of the sensors 20 include a thermal sensor, the thermal sensor measures thermal characteristics of the package handling system 16 and/or the surrounding environment.

After or while the sensors 20 are sensing conditions associated with the package handling system 16, output signals from the sensors are transferred to the transmitter 22, which transmits the signal data to the remote receiver 24 for transfer to the remote processor 26. The remote processor 26 analyzes the signal data received from the test package 12 to determine whether the signal data indicates an interesting event or condition (e.g., an undesired condition) associated with the package handling system 16, such as a package jam in the system or a tear or leak from the system or from a non-test package 18 being handled by the system. The conditions sensed by the sensors 20 and identified by the processor 26 can also include characteristics of the test package 12, such as the speed, orientation, or location of the test package. The processor 26 can also recognize when such characteristics are outside of certain specifications, such as when the package is moving faster than a pre-determined speed.

As mentioned above, operation of the monitoring apparatus 10 may include a learning or calibrating phase in which the test package 12 is subjected to stimuli, such as by being moved through the package handling system 16, and the processor 26 is programmed to affiliate particular stimuli with particular conditions or events. For example, the processor 26 can be programmed to recognize a tear in a conveyor by being taught what the conveyor belt looks like when intact and to determine that a tear exists or may exist when the belt no longer matches its intact form. As another example, the processor 26 can be programmed to recognize a location of the test package 12 during the learning phase by being programmed to affiliate particular images received from camera sensors 20 with particular parts of the package handling system 16. Users or designers of the monitoring apparatus can program the processor 26 using the communication devices 28, such as the visual display 52 (e.g., computer monitor), the keyboard 58, and the mouse 60.

Whether the processor 26 determines location of the test package 16 by way of processing sensor data 20 or by other means such as from data of a locating device 38, knowing the location of the test package 12 can be helpful in many ways. For example, the remote processor 26, determining that a problem or potential problem associated with the package handling system 16, can also recognize a location of the problem or potential problem. Knowing location of a problem or potential problem can be assist in monitoring the package handling system 10, such as by, for example, allowing users of the package handling system 16 to quickly attend to the problem or potential problem, allowing users of the system to clear an area of personnel as a safety precaution, and allowing users to selectively control the package handling system, such as by shutting down a section of the system.

In some contemplated embodiments (not shown in detail), the remote processor 26 or the local processor 42 is connected to the package handling system 16. In these embodiments, the monitoring apparatus 10 and the package handling system 16 may be configured so that the monitoring apparatus 10 may automatically control all or a part of the package handling system, such as by shutting down a portion of the system experiencing a problem or potential problem as determined by the test package 12. The monitoring apparatus 10 may also be configured to provide a notification or an alert at a central location, such as a room in which the remote processor 26 sits, or in an area of the problem or potential problem sensed by the test package 18, using the communication elements 28.

As described above, the processor 26 may provide information to the communication elements 28 (e.g., the visual display 52, the acoustic source 54, the light source 56) for notifying users of conditions associated with the package handling system 16 in a variety of formats. For example, the processor 26 may present lists, spreadsheets, charts, or graphs to the user by way of the visual display 52. The processor 26 may be configurable by users to provide these and other types of information to the users based on signals received from the test package 16. The processor 26 may also communicate messages to users in the form of verbal messages or sounds (e.g., tones) by way of the acoustic source or in the form of particular lights (e.g., lights having various colors), patterns of lighting (e.g., blinking), or illuminated signage including the light source 56.

Information communicated to the users via the communication devices 28 can advise them of conditions associated with the package handling system 16, such as a speed at which a conveyor is moving or a jam in the system. The information communicated to the users can also include instructions advising the users how to proceed, such as when the processor 26 causes the acoustic source 54 or monitors of the visual display 52 to broadcast or display a message for all users to hear or see or for users in a particular area of the package handling system (e.g., "Please attend to a package jam in this area").

In these and other ways, the monitoring apparatus 10 according to the present invention can be used to identify particular conditions associated with the package handling system 16 and advise users of those conditions. By sensing particular conditions associated with the package handling system 16, the monitoring apparatus 10 can identify problems and potential problems of the system. Early detection of problems and potential problems can be especially helpful for maintenance and operation of the package handling system 16 because it allows present problems to be addressed early, can limit negative effects (e.g., personal injury or damage to packages 12, 18 or to the system 16), and allow targeted preventative maintenance.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A method of monitoring a package handling system using an apparatus including a test package having a sensor positioned within an interior of the test package, the method comprising:
    sensing conditions associated with the package handling system using the sensor of the test package while the test package is being handled by the handling system.

2. A method as set forth in claim 1 wherein the sensor includes a camera and the sensing step includes capturing images of the conditions associated with the package handling system.

3. A method as set forth in claim 1 wherein the test package further includes a transmitter connected to the sensor and the monitoring apparatus further includes a processor remote from the test package and the method further comprises:
    producing a signal using the sensor, the signal corresponding to the conditions associated with the package handling system sensed by the sensor during the sensing step;
    transferring the signal from the sensor to the transmitter; and
    transmitting the signal received from the sensor to the remote processor wirelessly using the transmitter.

4. A method as set forth in claim 3 further comprising:
    processing the signal received from the transmitter of the test package using the remote processor, the processing including analyzing the signal for identifying whether a particular event is occurring within or adjacent the package handling system.

5. A method as set forth in claim 4 wherein the processor is configured so that the processing step includes analyzing the signal to identify as the particular event at least one event selected from a group of events consisting of an operational problem of the package handling system and a potential operation problem of the package handling system.

6. A method as set forth in claim 4 wherein the processor is configured so that the processing step includes analyzing the signal to identify as the particular event at least one event selected from a group of events consisting of a jam in the handling system, a leak in the handling system, a tear in a component of the handling system, and a potential jam in the handling system.

7. A method as set forth in claim 3 wherein the monitoring apparatus further includes a communication interface connected to the processor and the method further comprises communicating with a user of the monitoring apparatus regarding the conditions of the package handling system using the processor and the communication interface.

8. A method as set forth in claim 1 further comprising:
    introducing non-test packages into the package handling system;
    introducing the test package into the package handling system; and
    handling the test package and the non-test packages at the same time using the package handling system;
    wherein the sensing step is performed while the test package and the non-test packages are being handled using the handling system.

9. A method as set forth in claim 1 further comprising:
    affixing a first label to the test package corresponding to labels affixed to non-test packages; and
    reading information from the first label affixed to the test package while the test package is being handled by the package handling system.

10. A method as set forth in claim 9 wherein the first label includes at least one label element selected from a group of label elements consisting of a bar code, an RFID tag, and human-readable data.

11. A method as set forth in claim 9 further comprising:
    removing the first label from the test package and affixing a second label to the test package; and
    reading information from the second label affixed to the test package while the test package is being handled by the package handling system.

12. A method as set forth in claim 9 wherein the monitoring apparatus further includes a locating subsystem and the method further comprising locating the test package while the test package is being handled by the package handling system using the location subsystem.

* * * * *